US006320512B1

(12) United States Patent
Nicholson et al.

(10) Patent No.: US 6,320,512 B1
(45) Date of Patent: Nov. 20, 2001

(54) TEMPERATURE MONITOR FOR TEMPERATURE SENSITIVE PRODUCTS

(75) Inventors: Larry Nicholson, 13970 Red Dog Rd., Nevada City, CA (US) 95958; Cliff Tyner, 11324 Alta Sierra Dr., Grass Valley, CA (US) 95949; Ronald Newton, Carson City, NV (US)

(73) Assignees: Larry Nicholson; Cliff Tyner

( * ) Notice: Subject to any disclaimer, the term of this patent is extended or adjusted under 35 U.S.C. 154(b) by 0 days.

(21) Appl. No.: 09/706,030

(22) Filed: Nov. 3, 2000

(51) Int. Cl.[7] .................................................... G08B 17/00
(52) U.S. Cl. ........................... 340/588; 340/589; 340/521
(58) Field of Search ..................................... 340/588, 589, 340/691.4, 691.6, 511, 521, 522, 524; 73/866.2; 374/102, 103, 104, 208

(56) References Cited

U.S. PATENT DOCUMENTS

Re. 36,200 * 4/1999 Berrian et al. ...................... 73/866.2
4,685,614 * 8/1987 Levine .............................. 236/78 D
5,262,758 * 11/1993 Nam et al. .......................... 340/588
5,313,848 5/1994 Santin et al. .
6,046,674 * 4/2000 Irwin et al. ......................... 340/539
6,058,356 * 5/2000 Swanson et al. ...................... 702/99

* cited by examiner

*Primary Examiner*—Van Trieu
(74) *Attorney, Agent, or Firm*—Jack Lo

(57) ABSTRACT

The present temperature monitor is comprised of a thermistor and a reference resistor connected to a capacitor in parallel. The capacitor is charged through the thermistor by a microcontroller to determine the thermistor charging time, discharged, and then charged through the reference resistor to determine a reference charging time. The thermistor charging time is divided by the reference charging time to determine the thermistor value, which is converted into an actual temperature by using a conventional algorithm. The microcontroller is programmed to activate various indicators to show the ambient temperature relative to one or more acceptable ranges, whether the temperature has reached the acceptable ranges within an acceptable time period, and whether the temperature has had an upward trend prior to reaching the acceptable ranges.

7 Claims, 3 Drawing Sheets

TEMPERATURE MONITOR FOR TEMPERATURE SENSITIVE PRODUCTS

BACKGROUND OF THE INVENTION

1. Field of the Invention

This invention relates generally to temperature monitoring devices.

2. Prior Art

Some temperature sensitive products must be shipped and stored within strict temperature limits. For example, according to FDA (Food and Drug Administration) regulations, freshly drawn whole blood must be cooled from body temperature down to a storage temperature range of between 1–6 degrees Celsius within 6 hours. The temperature range during shipment can be between 1–10 degrees Celsius. In addition, the blood temperature must decline in a continuously downward trend when cooling toward the shipping and storage temperature ranges. Many other pharmaceutical products also have temperature and cooling trend requirements.

Various temperature monitors have been specifically made for monitoring pharmaceutical products. Some are simple data recorders that record a numeric temperature history over time. The data must be interpreted by a trained technician, and often requires an external computer to perform the analysis. Other devices provide alarms that are triggered if the temperature is out of an acceptable range, or out of range for a predetermined period of time. The alarm may not be produced if the temperature trends upward for less than the predetermined time, wherein such an upward trend is in violation of FDA regulations. An example of such a device is disclosed in U.S. Pat. No. 5,313,848 to Santin et al.

OBJECTIVES OF THE INVENTION

Accordingly, the objectives of the present temperature monitor are:

- to monitor the temperature of a temperature sensitive product;
- to activate a first acceptable condition indicator if the temperature is cooled to an acceptable range within an acceptable time period;
- to maintain the first acceptable condition indicator if the temperature is reduced in a continuously downward trend fast enough to reach the acceptable range within the acceptable time period;
- to activate an alert indicator if the temperature does not reach the first acceptable range within the acceptable time period;
- to activate the alert indicator if the temperature has had an upward trend prior to reaching the acceptable range;
- to activate a second acceptable condition indicator if the temperature rises from the first acceptable range to a second acceptable range;
- to activate an over temperature indicator if the temperature rises above the second acceptable range;
- to activate an under temperature indicator if the temperature falls under the first acceptable range;
- to latch on the worse condition indicator and never return to better condition indicators once the worse condition indicator is activated;
- to be compact enough for being sandwiched between products; and
- to be simple and inexpensive to manufacture.

Further objectives of the present invention will become apparent from a consideration of the drawings and ensuing description.

BRIEF SUMMARY OF THE INVENTION

The present temperature monitor is comprised of a thermistor and a reference resistor connected to a capacitor in parallel. The capacitor is charged through the thermistor by a microcontroller to determine the thermistor charging time, discharged, and then charged through the reference resistor to determine a reference charging time. The thermistor charging time is divided by the reference charging time to determine the thermistor value, which is converted into an actual temperature by using a conventional algorithm. The microcontroller is programmed to activate various indicators to show the ambient temperature relative to one or more acceptable ranges, whether the temperature has reached the acceptable ranges within an acceptable time period, and whether the temperature has had an upward trend prior to reaching the acceptable ranges.

DETAILED DESCRIPTION OF THE INVENTION

Figure 1:
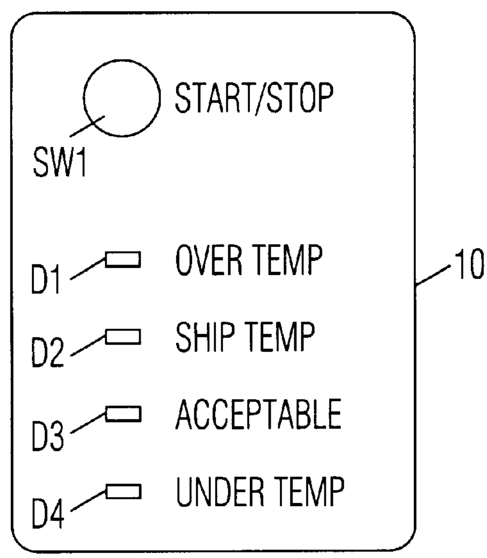
FIG. 1 is a front view of the present temperature monitor.

FIG. 1:

A preferred embodiment of the present temperature monitor is shown in a front view in FIG. 1. It is comprised of a housing 10 with a start/stop switch SW1, an over temperature indicator lamp D1, a shipping temperature indicator lamp D2, an acceptable temperature indicator lamp D3, and an under temperature indicator lamp D4. Housing 10 is preferably about the size of a credit card and thin enough to be placed between packages of temperature sensitive products. The temperature monitor is preferably prearranged for monitoring a specific product, such as whole blood, to eliminate the need for user programming and the associated risk of human error. It may be arranged for monitoring any type of product by being provided with different labels for the indicator lamps, a different number of lamps, or different activation parameters for the lamps.

Figure 2:
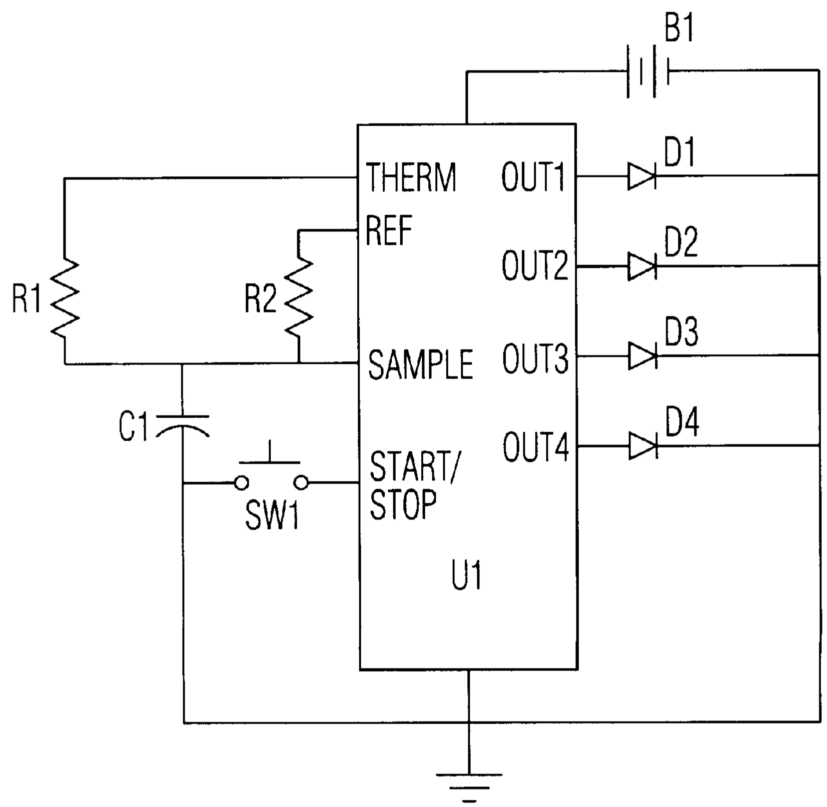
FIG. 2 is a circuit diagram thereof.

FIG. 2:

A circuit diagram of the temperature monitor is shown in FIG. 2. Start/stop switch SW1 is connected to the start/stop pin on a microcontroller U1, which may be of any suitable type. Indicator lamps D1–D4 are respectively connected to output pins OUT1–OUT4 on microcontroller U1. Although lamps D1–D4 are shown connected to a common ground, they may be connected to a common power source if output pins OUT1–OUT4 go low when they are enabled.

A temperature sensor or thermistor R1 and a reference resistor R2 are respectively connected to a thermistor pin and a reference pin on microcontroller U1. Thermistor R1 is a resistor or any other device which varies its resistance according to the ambient temperature. Reference resistor R2 is a precision fixed resistor with a known value which is within a tight tolerance. Thermistor R1 and reference resistor R2 are connected in parallel to a capacitor C1. The junction between thermistor R1, reference resistor R2, and capacitor C1 are connected to a sample pin on microcontroller U1, which together create a very low cost and simple analog-to-digital converter. The sample pin may be either a digital input or an analog comparator input. A battery B1 is also connected to microcontroller U1 to provide power, and is preferably a lithium 3V coin cell for small size and long lasting power.

Figure 3:
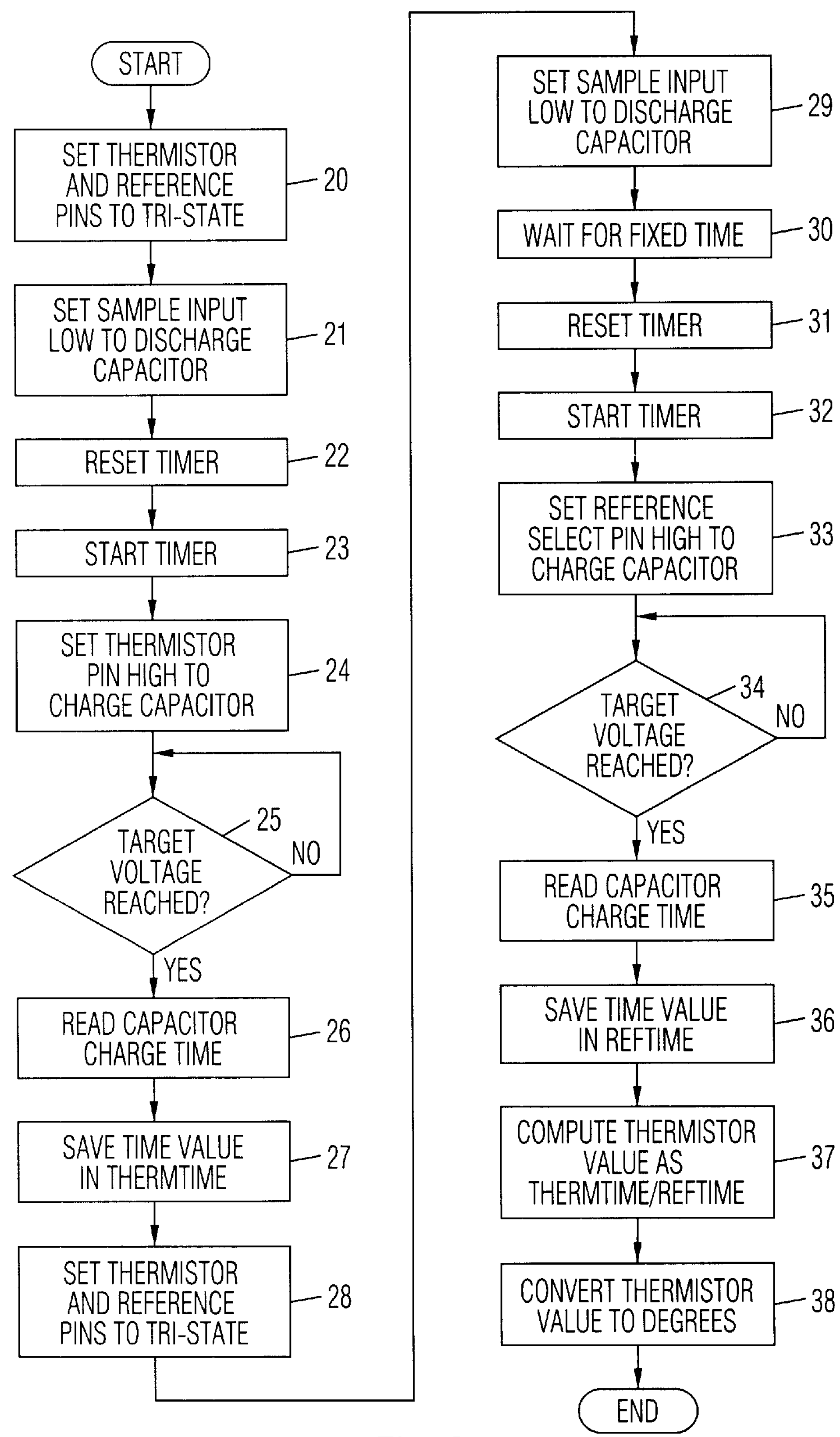
FIG. 3 is a flowchart showing the process for converting a thermistor resistance into a temperature reading by the monitor.

FIG. 3:

The microcontroller is preprogrammed to control the operation of the temperature monitor. The process for reading the ambient temperature is shown in FIG. 3. At block 20, the thermistor and reference resistor pins are set to tri-state, which is equivalent to an open circuit. At block 21, the sample pin is set low to discharge the capacitor. A timer is reset at block 22 and restarted at block 23. At block 24, the thermistor pin is set high to charge the capacitor through the thermistor. The process is looped at block 25 until the voltage at the sample pin has reached a target voltage. If the sample pin is a digital input, the target voltage is preferably logic 1, that is, the threshold voltage at which the logic state is switched from 0 to 1. If the sample pin is a comparator input, the target voltage may be set to another voltage. At the moment the target voltage is reached, the timer's count or value is read at block 26 and saved as thermistor time or "thermtime" at block 27. The thermistor time is thus the time taken to charge the capacitor through the thermistor. Since the resistance of the thermistor is proportional to the ambient temperature, the thermistor time is also proportional to the ambient temperature.

At block 28, the thermistor and reference resistor pins are again set to tri-state. At block 29, the sample pin is set low to discharge the capacitor until a predetermined time period has passed at block 30 to ensure that the capacitor has completely discharged. The timer is reset at block 31 and restarted at block 32. At block 33, the reference resistor pin is set high to charge the capacitor through the precision reference resistor. The process is looped at block 34 until the voltage at the sample pin has reached the target voltage. At the moment the target voltage is reached, the timer's count or value is read at block 35 and saved as reference time or "reftime" at block 36. At block 37, the thermistor value is computed by dividing "thermtime" by "reftime", which eliminates errors due to capacitor variances and logic state switching threshold. Alternatively, the charging sequence may be reversed to charge the capacitor through the thermistor first.

The accuracy of the thermistor value is dependent only on the accuracy of the reference resistor, and the predictability of the resistance of the thermistor relative to the ambient temperature. At block 38, the thermistor value is converted to a temperature in degrees by using a conventional algorithm which is well known in the art of temperature sensing.

Figure 4:
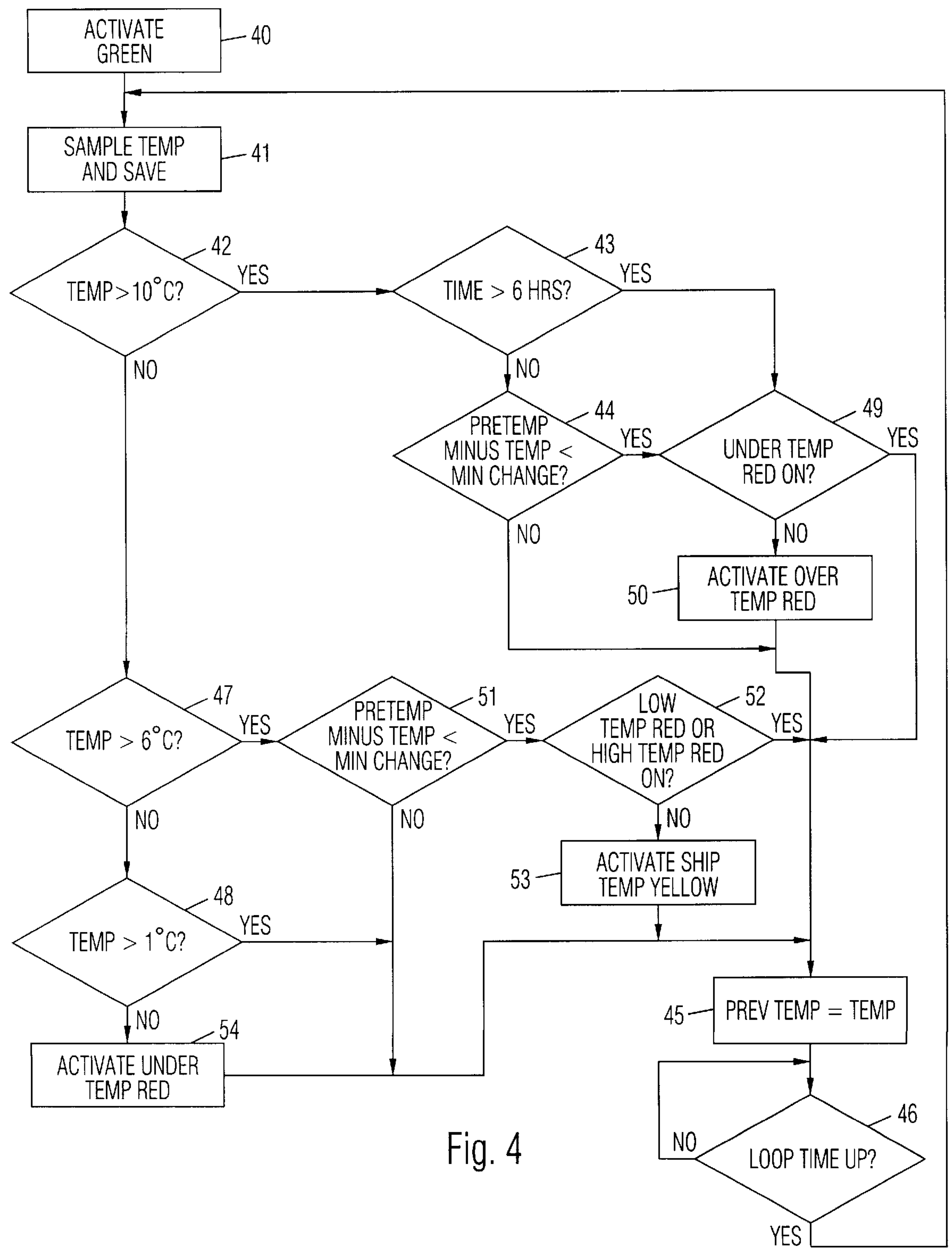
FIG. 4 is a flowchart showing the process for activating different indicators on the monitor according to the temperature reading.

FIG. 4:

The process for controlling the indicator lamps is shown in FIG. 4. The device is reset for each use by pressing the start/stop button, and placed among the products to be monitored prior to cooling. At block 40, the microcontroller is initialized and the Acceptable temperature green lamp is activated to indicate that the ambient temperature is acceptable. The value for a previous temperature or "pretemp" used later for calculating temperature change is set at an arbitrary maximum value, such as 100 degrees Celsius. At block 41, the ambient temperature is sampled according to the process shown in FIG. 3, and saved as the current temperature or "temp."

At block 42, if "temp" is more than a first temperature, such as 10 degrees Celsius, the process proceeds to block 43. If the elapsed time since initialization is less than an acceptable period at block 43, such as 6 hours, the process proceeds to block 44. If "temp" is lower than "pretemp" by a predetermined minimum at block 44, then the ambient temperature is dropping fast enough and the acceptable cooling period has not expired. At block 45, "temp" is saved as or shifted into "pretemp" in anticipation for an updated reading of "temp." After a predetermined waiting or loop time has expired at block 46, the process is returned to block 41. Therefore, the Acceptable temperature green lamp will stay lit as long as the ambient temperature continues on a fast enough downward cooling trend within the acceptable time period. The reading for the ambient temperature is updated at intervals determined by the loop time at block 46. As an example, an update every 10 to 30 minutes is sufficient for whole blood.

If the temperature has not dropped enough or has even risen at block 44, and the Under Temp red lamp is not already activated at block 49, then the Over Temp red lamp is activated at block 50 to indicate that the temperature has had an unacceptable upward trend.

If "temp" is less than the first temperature at block 42, and less than a second temperature, such as 6 degrees Celsius, at block 47, but more than a third temperature, such as 1 degree Celsius, at block 48, the process will continue to block 45 to wait for the next temperature update. Therefore, the Acceptable temperature green lamp is maintained as long as the ambient temperature follows a downward trend without ever rising and reaches a first acceptable range within the acceptable time period. In the example of whole blood, the temperature trend is acceptable if it reaches a first or storage range of 1–6 degrees Celsius within 6 hours.

If "temp" is more than the first temperature at block 42, the elapsed time since initialization is more than an acceptable period at block 43, and the Under Temp red lamp is not already activated at block 49, then the Over Temp red lamp is activated at block 50. In the example of whole blood, if the temperature has not cooled to less than 10 degrees Celsius within 6 hours the Over Temp red lamp will be activated to indicate that the blood has not been cooled properly. If the Under Temp red lamp is found to be already activated at block 49, the Over Temp red lamp will not be activated. This can happen if the temperature has cooled to below the acceptable range and has risen back above the acceptable range.

If "temp" is more than the second temperature at block 47, and "temp" is less than "pretemp" by an acceptable minimum at block 51, the process is advanced to block 45 and the Acceptable temperature green lamp is maintained. In the example of whole blood, if the temperature is within the shipping range of 6–10 degrees Celsius and is still continuing on a downward trend, the green lamp is maintained to indicate that the blood is cooling properly. If the temperature has not dropped enough or has even risen at block 51, the Low Temp and High Temp red lamps are checked at block 52. If either one is already activated, the process is continued at block 45. If both red lamps are off, then the Ship Temp yellow lamp is activated at block 53. In the example of whole blood, the Ship Temp yellow lamp is activated if the temperature reaches the shipping range of 6–10 degrees Celsius within 6 hours, but is not declining toward the storage range of 1–6 degrees Celsius or has risen.

If "temp" is less than the third temperature at block 48, then the Under Temp red lamp is activated at block 54. In the example of whole blood, the Under Temp red lamp is activated if the temperature is below the acceptable storage range of 1–6 degrees Celsius.

SUMMARY AND SCOPE

Accordingly, the present temperature monitor thus activates a first acceptable condition indicator if the temperature is cooled to an acceptable range within an acceptable time period. It maintains the first acceptable condition indicator if the temperature is reduced in a continuously downward trend. It activates an alert indicator if the temperature does not reach the first acceptable range within the acceptable time period. It activates the alert indicator if the temperature has had an upward trend prior to reaching the acceptable range. It activates a second acceptable condition indicator if the temperature rises from the first acceptable range to a second acceptable range. It activates an over temperature indicator if the temperature rises above the second acceptable range. It activates an under temperature indicator if the temperature falls under the first acceptable range. It is compact enough for being sandwiched between products. It is also simple and inexpensive to manufacture.

Although the above description is specific, it should not be considered as a limitation on the scope of the invention, but only as an example of the preferred embodiment. Many variations are possible within the teachings of the invention. For example, the temperature monitor can be arranged for different products by altering the temperatures ranges, number of indicator lamps, acceptable cooling period, loop time, acceptable minimum temperature change per loop, etc. The green lamp may be turned off after the red or yellow lamps are activated, or all previously activated lamps may stay on at the same time to indicate the temperature history. Each condition for the red or yellow lamps may be required to be stable for a predetermined period before activating the corresponding lamp to prevent false alarms. The names of the temperature ranges may be altered. The lamps may be replaced with other types of indicators, such as a bar graph, text messages, etc. Therefore, the scope of the invention should be determined by the appended claims and their legal equivalents, not by the examples given.

We claim:

1. A temperature monitor, comprising:

a microcontroller;

a thermistor with a first end connected to a thermistor pin on said microcontroller;

a reference resistor with a first end connected to a reference pin on said microcontroller, and a second end connected to a second end of said thermistor; and a capacitor connected to a junction between said thermistor and said reference resistor;

wherein said junction between said thermistor, said reference resistor, and said capacitor is connected to a sample pin on said microcontroller;

wherein said microcontroller is arranged to:

charge said capacitor only through said reference resistor until a predetermined voltage at said sample pin is reached;

measure a reference charging time taken to reach said voltage;

discharge said capacitor;

charge said capacitor only through said thermistor until said voltage at said sample pin is reached;

measure a thermistor charging time taken to reach said voltage;

compute a thermistor value by dividing said thermistor charging time by said reference charging time to eliminate errors caused by capacitor variances; and converting said thermistor value into a corresponding temperature.

2. The temperature monitor of claim 1, wherein said voltage is comprised of a logic switching threshold of said microcontroller for simplicity.

3. A temperature monitor for monitoring a cooling process, comprising:

a microcontroller;

a temperature sensor connected to said microcontroller;

an over temperature indicator connected to said microcontroller;

an acceptable temperature indicator connected to said microcontroller;

wherein said microcontroller is programmed to:

monitor an ambient temperature with said temperature sensor;

activate said acceptable temperature indicator when said ambient temperature is declining toward a predetermined storage range;

activate said over temperature indicator when said ambient temperature is not within said storage range upon expiration of a predetermined time period; and activate said over temperature indicator when said ambient temperature has an upward trend prior to reaching said storage range.

4. The temperature monitor of claim 3, wherein said microcontroller is further arranged to activate said over temperature indicator when said ambient temperature is declining too slowly to reach said storage range within said time period.

5. The temperature monitor of claim 3, further including a shipping temperature indicator connected to said microcontroller, which is further programmed to activate said shipping temperature indicator when said ambient temperature is within a predetermined shipping range which is higher than said storage range, and said ambient temperature is declining too slowly to reach said storage range within said time period.

6. The temperature monitor of claim 3, further including an under temperature indicator connected to said microcontroller, which is further programmed to activate said under temperature indicator when said ambient temperature is below than said storage range.

7. A temperature monitor for monitoring a cooling process, comprising:

a microcontroller;

a temperature sensor connected to said microcontroller;

an over temperature indicator connected to said microcontroller;

a shipping temperature indicator connected to said microcontroller;

an acceptable temperature indicator connected to said microcontroller; and an under temperature indicator connected to said microcontroller;

wherein said microcontroller is programmed to:

monitor an ambient temperature with said temperature sensor;

activate said acceptable temperature indicator when said ambient temperature is declining toward a predetermined storage range;

activate said over temperature indicator when said ambient temperature is not within said storage range upon expiration of a predetermined time period;

activate said over temperature indicator when said ambient temperature is not declining fast enough to reach said storage range within said time period;

activate said over temperature indicator when said ambient temperature has an upward trend prior to reaching said storage range;

activate said shipping temperature indicator when said ambient temperature is within a predetermined shipping range which is higher than said storage range, and said ambient temperature is not declining fast enough to reach said storage range within said time period; and activate said under temperature indicator when said ambient temperature is below than said storage range.

* * * * *